United States Patent [19]
Peth et al.

[11] 3,946,153

[45] Mar. 23, 1976

[54] SYSTEM FOR PRODUCING A CORRECTION SIGNAL FOR THE APERTURE CORRECTION OF VIDEO SIGNALS

[75] Inventors: Horst Peth, Alsbach; Gerhard Illetschko, Darmstadt, both of Germany

[73] Assignee: Robert Bosch Fernsehanlagen GmbH, Darmstadt, Germany

[22] Filed: May 3, 1974

[21] Appl. No.: 466,820

[30] Foreign Application Priority Data
May 25, 1973 Germany............................ 2326620

[52] U.S. Cl............................ 178/7.1; 178/DIG. 25
[51] Int. Cl.².......................................... H04N 5/197
[58] Field of Search........ 178/7.1, DIG. 25, DIG. 34

[56] References Cited
UNITED STATES PATENTS

| | | | |
|---|---|---|---|
| 3,549,901 | 12/1970 | Ross et al. .................. | 178/DIG. 25 |
| 3,562,424 | 2/1971 | Legler.......................... | 178/DIG. 25 |
| 3,836,707 | 9/1974 | Murakami et al. .......... | 178/DIG. 25 |

FOREIGN PATENTS OR APPLICATIONS

233,738 · 5/1969 U.S.S.R....................... 178/DIG. 25

*Primary Examiner*—George H. Libman
*Attorney, Agent, or Firm*—Littlepage, Quaintance, Murphy & Dobyns

[57] ABSTRACT

Correction signals for aperture correction of video signals are generated in such a way that the peak values of the correction signal produced in an aperture corrector which are dependent upon the frequency of the video signal to be corrected are maintained constant.

8 Claims, 10 Drawing Figures

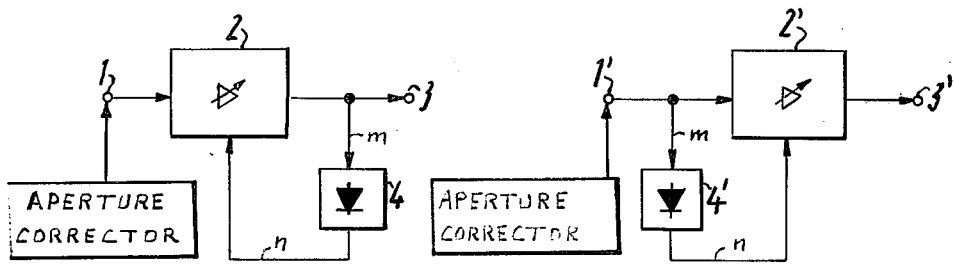
Fig. 1    Fig. 2
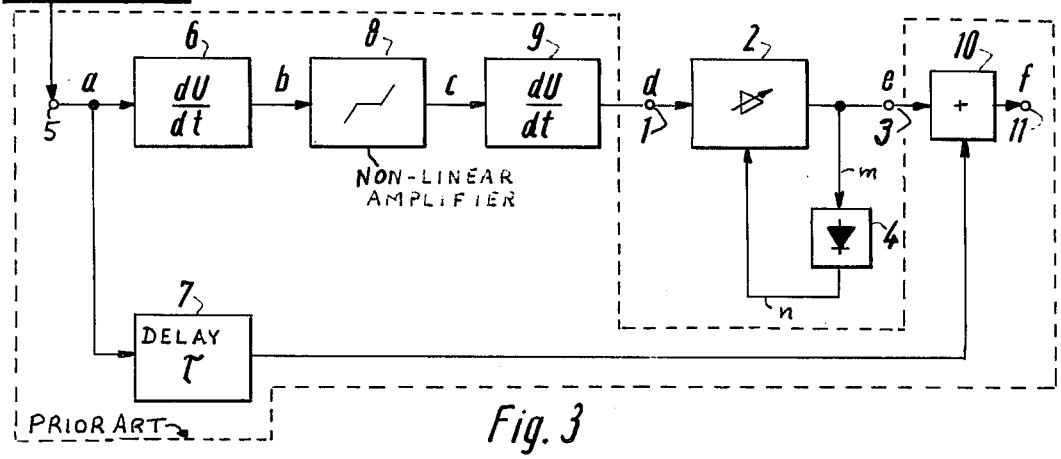
Fig. 3
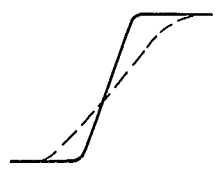
Fig. 4a
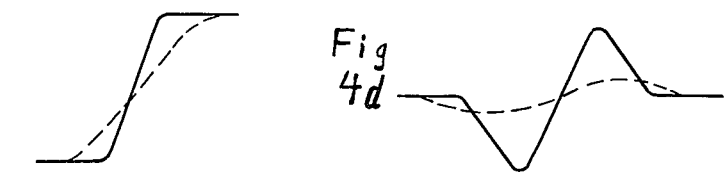
Fig. 4d
Fig. 4b
Fig. 4e
Fig. 4c
Fig. 4f
Fig. 5
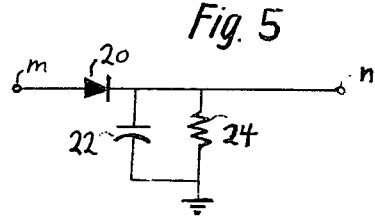

SYSTEM FOR PRODUCING A CORRECTION SIGNAL FOR THE APERTURE CORRECTION OF VIDEO SIGNALS

BACKGROUND OF THE INVENTION

1. Field of the Invention

The invention related to a system for producing a correction signal for the aperture correction of video signals.

2. Description of the Prior Art

Aperture correction of video signals comprises correction of the distortion produced by the finite dimension and non-uniform flux distribution of the scanning point, in the camera as well as in the reproduction screen. Thus, for example, the frequency spectrum of the video signals obtained by means of known camera tubes falls off more or less intensely toward the high frequencies, still within the bandwidth of 6 MHz. Such an aperture distortion, caused by amplitude distortion, causes a symmetrical obliteration of the pulse edges in the video signal. For the elimination of such aperture distortions, horizontal and vertical aperture correctors are used to reamplify the higher frequencies of the video signal.

Devices for amplifying the higher frequencies of the video signal in aperture correctors are known from Dillenburger, *Einfuhrung in die Fernsehtechnik* (*Introduction to Television Technology*), Volume 2, pages 312 to 324. These known aperture correctors, however, are dependent on the bandwidth of the video signal to be corrected. Thus, a video signal to be corrected, with pulses of differing rise time, will itself only be differentially corrected. Pulses with a short rise time are given a steeper pulse-edge slope than are pulses with a long rise time.

A picture is considered distinct when some sharply defined edges are contained in the reproduced image. Since known aperture correctors supply correction signals whose amplitude depends upon the rise time of the black-to white-amplitude changes contained in the video signal, the pulses of a video signal in whose picture patterns there are only long rise times are reproduced in an entirely uncorrected or only slightly corrected manner. The reproduced picture appears blurred. Assuming that during the time period of a picture-scanning at least one black-to white-amplitude change is contained in the video signal, a reference value can be derived for other signal amplitudes in the video signal by means of this black-to white-amplitude change for one or more partial pictures.

SUMMARY OF THE INVENTION

The present invention therefore provides a system for producing a correction signal for the aperture correction of video signals, in which systems the correction signal is independent of the bandwidth, that is, the correction signal is independent of the prevailing rise time of the pulses in the video signal to be corrected.

This is accomplished in the invention by keeping constant the peak values of the correction signal produced in an aperture corrector. The peak values are dependent upon the frequency of the video signal to be corrected.

The system of the invention presents, in contrast to known devices for the production of a correction signal for aperture correction of video signals, the advantage that by a simple additional regulation or control of the correction signal an improved correction signal is obtained whose peak values are independent of the frequency, that is, independent of the rise time of the pulses in the video signal. The invention provides for taking correction signals from known aperture correctors and keeping their amplitudes constant, indepenent of their frequency.

BRIEF DESCRIPTION OF THE DRAWINGS

FIG. 1 is a block diagram of an automatic control system according to the system of the invention.

FIG. 2 is a block diagram of a control circuit according to the system of the invention.

FIG. 3 is a block diagram of an aperture corrector according to the crispening method with an automatic control circuit according to the system of the invention.

FIG. 4 includes voltage-time diagram for explanation of the block diagram of FIG. 3.

FIG. 5 is a diagram of a rectifier stage which can be used in the present invention.

The same symbols used in several figures are provided with the same reference symbols.

DESCRIPTION OF THE PREFERRED EMBODIMENTS

In FIG. 1 the correction signal produced by a known prior art aperture corrector is fed via a terminal 1 to an automatic controllable amplifier 2. This amplifier may be of the type for automatic gain control. One such amplifier is described in RCA Transistor, Thyristor and Diode Manual, April 1971, pages 98–99. The correction signal received at the output of amplifier 2 can be tapped by way of a terminal 3. A part of the correction signal received at terminal 3 is fed to a rectifier stage 4. By means of this rectifier stage 4, a control potential dependent upon the peak values of the correction signal received at terminal 3 is obtained. This control potential readjusts amplifier 2 in such a way that correction signals with constant peak values can be tapped at terminal 3. By storing the greatest peak value of the correction signal in the rectifier stage 4, the result is achieved that the amplitude of the correction signal at terminal 3 remains constant for a certain length of time. As a store for the greatest peak value of the correction signal, a capacitor can advantageously be employed.

FIG. 2 shows the block diagram of a control circuit according to the system of the invention. Here the correction signal produced by an aperture corrector is fed, by way of a terminal 1', to a controllable amplifier 2' and to a rectifier stage 4'. The correction signals fed by way of terminal 1' are rectified by rectifier stage 4'. From the rectified correction signal a signal with the greatest peak value is stored for the duration of one or more partial pictures and is fed to a control input of amplifier 2'. By controlling the gain of the amplifier 2', the correction signal which can be fed out at terminal 3' from the output of amplifier 2' is controlled in such a way that the amplitude of the correction signal is approximately constant.

FIG. 3 shows a block diagram of a crispening circuit expanded according to the system of the invention. The video signal of a video source to be aperture-corrected is fed, by way of a terminal 5, in parallel to a differentiating stage 6 and to a delay stage 7. The first differential video signal from the output of the differentiating stage 6 is subjected, by means of an amplifier stage 8, to a non-linear amplification. The characteristic of this non-linear amplifier 8 is shaped in such a way that signals with small amplitudes are not amplified. Due to this device, disturbing noise levels in the video signal are less visible in the reproduction on a picture screen. By an additional differentiation of the non-linearly amplified signal in a second differentiating stage 9, a second differential video signal is derived from the video signal to be corrected and is fed, by way of a terminal 1, to an automatic-gain control amplifier 2. By feedback regulation, the correction signal present at the output of amplifier 2 on terminal 3 is regulated, by means of rectifier stage 4, in such a way that the peak values of the correction signal are kept constant. This new correction signal is added to the delayed video signal to be corrected from delay stage 7 in an adding stage 10. Delay stage 7 is provided for the purpose of equalizing the travel time of the two signals to adding stage output terminal 11.

FIG. 4a shows the voltage-time diagrams of two different pulse edges of video signals to be corrected. In this structure the pulse edge shown in dashed lines has a longer rise time than the pulse edge shown in solid lines. A differentiation of the various pulse edges according to FIG. 4a in differentiating element 6 results in a curve shaped according to FIG. 4b. By a subsequent non-linear amplification by means of non-linear amplifier 8, signals reduced in amplitude according to FIG. 4c are obtained. A further differentiation in element 9 of the signals according to FIG. 4c results in a correction signal with a curve shaped as in FIG. 4d. By the repeated differentiation, correction signals are obtained at terminal 1 (FIG. 3) whose peak values, with rise times of the pulse edges according to FIG. 4a, are varied. Series connection of the control circuit with stages 2 and 4 in the structure keeps the varied peak values of the correction signals at terminal 1 constant. When then, by means of adding stage 10, the signals of FIG. 4a as delayed and the corresponding correction signals of FIG. 4e are added, the pulse edges become steeper, as in FIG. 4f. As the curve shape of FIG. 4f shows, also pulses of a video signal with long rise time to be corrected are provided with much steeper pulse edges. If the control circuit with elements 2 and 4 were dispensed with, a corrected video signal could be tapped at terminal 1 which presents in pulse edges with a long rise time the curve shape shown in pointed-dashed lines in FIG. 4f.

FIG. 5 is a diagram of a rectifier stage which can be used as element 4 or 4' in FIGS. 1, 2, or 3. See the above cited RCA book at page 98, FIG. 145. Input terminal m and output terminal n of the rectifier stage are connected as illustrated. A diode 20 has a charging capacitor 22 in series connection therewith as illustrated. The charging capacitor 22 stores rectified voltage peaks of the signal applied to terminal m, so that the voltage on the capacitor always corresponds to the highest voltage peak of the signal applied to terminal m. The size of capacitor 22 and a resistor 24 determine the length of time a previouly detected peak will be stored, which should amount to one or more picture scanning periods.

We claim:

1. A system for producing an output correction signal for aperture correction of video signals, comprising:
   A. a video amplifier having a controllable amplification characteristic and input and output terminals,
   B. an aperture corrector for supplying to the input terminal of the amplifier a correction signal which is dependent upon the time derivative of the video signal from a video source to be corrected,
   C. means for detecting peak values of correction signals at one of the amplifier terminals, and
   D. means for using the detected peak values to control said amplification characteristic for causing the output correction signal to appear with a constant amplitude at the output terminal.

2. A system according to claim 1, wherein the means for detecting peak values detects the peak values of correction signals at the output terminal of the video amplifier.

3. A system according to claim 1, wherein the means for detecting peak values detects the peak values of correction signals at the input terminal of the video amplifier.

4. A system according to claim 1, wherein the aperture corrector for supplying the correction signal further comprises:
   A. first differentiating means for deriving a first time-differential signal from a video signal supplied at the output of a video source,
   B. means for non-linear amplification of the first time-differential signal to provide an amplified signal,
   C. second differentiating means for deriving a second time-differential signal from the amplified signal and for applying said second signal to the input terminal of the video amplifier,
   D. means for delaying said video signal supplied at the output of the video source to supply a delayed video signal, and
   E. means for adding the output correction signal at the output of the video amplifier and the delayed video signal to provide a corrected video signal.

5. A system according to claim 1, wherein from correction signal produced in known aperture correctors a reference signal is derived which serves for controlling the video amplifier.

6. A system according to claim 5, wherein the reference signal is proportional to the maximum peak value of the correction signal during one or more picture scannings.

7. A system according to claim 6, wherein the reference signal is proportional to the maximum peak value of the correction signal is stored in a storage device for the duration of one or more picture scannings.

8. A system according to claim 7, wherein the storage device is a capacitor.

* * * * *